March 29, 1960  T. HARADA  2,930,234
MAXIMUM-MINIMUM THERMOMETER
Filed Sept. 25, 1957
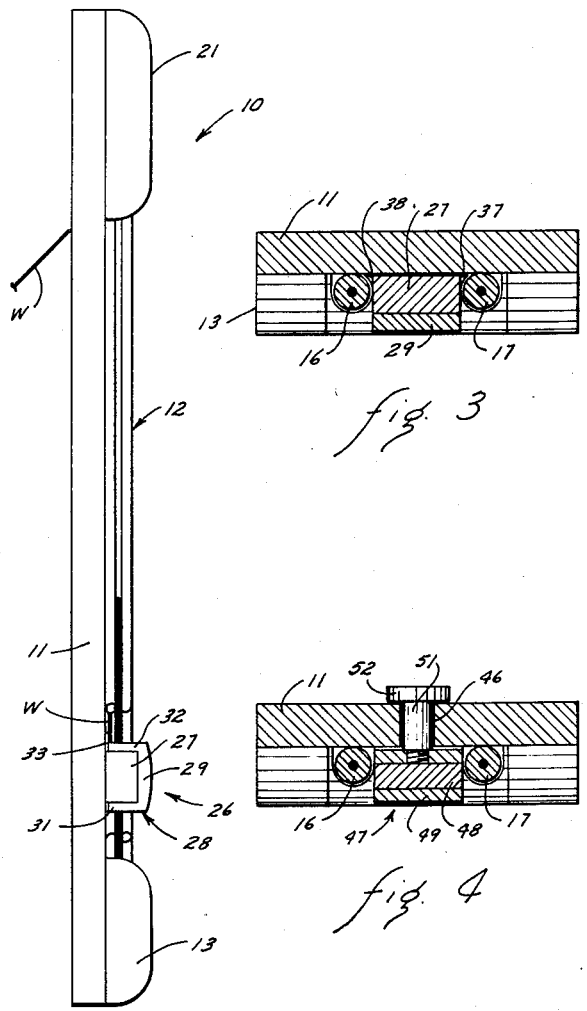
INVENTOR.
TOMIO HARADA
BY
ATTORNEYS

United States Patent Office 2,930,234
Patented Mar. 29, 1960

2,930,234

MAXIMUM-MINIMUM THERMOMETER

Tomio Harada, Kalamazoo, Mich.

Application September 25, 1957, Serial No. 686,260

2 Claims. (Cl. 73—371)

This invention relates to a thermometer of the type wherein indicating elements are provided to indicate the maximum and minimum temperatures occurring between successive observations of the thermometer. More particularly, this invention relates to a maximum-minimum type thermometer wherein the elements indicating the maximum and minimum temperatures are returned to contact with the temperature responsive medium, as mercury, within the thermometer by means of a magnet which is permanently, though movably, mounted on the thermometer structure.

It is frequently desired to obtain an indication of the maximum and minimum temperatures occurring during a given time period. For example, a person may desire to know the maximum and minimum out-door temperatures during any given twenty-four hour period. It has been common for many years to provide a thermometer construction wherein the glass tube is U-shaped so as to provide two legs. A temperature responsive medium, such as mercury, is disposed within such legs and a temperature scale is provided on, or adjacent to, each of the legs, the respective scales being arranged in inverse order. As the temperature rises, the mercury in one leg will rise while the mercury in the other leg will drop. Similarly, as the temperature drops, the mercury within the other leg will rise and the mercury in the one leg will drop. Indicating elements, such as small rods, are placed within the legs and moved upwardly by the mercury within such legs to the highest level attained by the mercury in the respective legs. Because of the inverse arrangement of the temperature scales, the positions of the indicating elements will indicate the maximum and minimum temperature occurring during a desired period. The indicating elements may be returned to contact with the mercury within the respective legs by moving magnets in close proximity to the indicating elements and thereby magnetically attracting the indicating elements to the proper position.

While it has been suggested to use magnets for returning the indicating elements to contact with the mercury within the respective legs of the tube, such magnets are separate from the thermometer structure and are intended to be carried by the user. It frequently happens that such magnets are lost or misplaced so that they are not available when it is desired to return the indicating elements to the proper position. Further, when the returning of the rods to contact with the temperature responsive fluid is to be accomplished by remote control, as where the instrument is to be placed out-of-doors to be viewed through a window, the conventional return means are totally inadequate. Thus, insofar as I am aware, prior maximum-minimum type thermometer constructions have not been completely satisfactory because of the difficulty of having the magnet available at the time and place needed for returning the indicating elements to the proper position.

Accordingly, it is a major object of this invention to provide a maximum-minimum type thermometer wherein the magnet for returning the indicating elements to the proper position is permanently, though movably, associated with the thermometer structure.

It is a further object of this invention to provide a maximum-minimum thermometer, as aforesaid, in which the magnet is so mounted that it may be freely moved along and may be guided by the respective legs of the glass tubes.

A further object of this invention is to provide a maximum-minimum type of thermometer, as aforesaid, which is inexpensive to manufacture, durable in use and easily operated.

Other objects and advantages of this invention will become apparent to those acquainted with equipment of this type upon reading the following description and inspecting the accompanying drawings, in which:

Figure 1 is a front elevational view, partially broken away, of the thermometer construction.

Figure 2 is a side elevational view, partially broken away, of the thermometer construction.

Figure 3 is a sectional view taken along the line III—III of Figure 1.

Figure 4 is a sectional view similar to Figure 3 showing an alternate structure.

Referring now to the drawings, the thermometer structure 10 includes a flat rectangular backing plate 11. A substantially U-shaped glass tube 12 is mounted on the backing plate 11. The lower portion of the U-shaped tube is secured to the backing plate by means of a lower block 13 which is removably secured to the backing plate 11. The block 13 is recessed, as at 14, for snugly surrounding the lower portion of the U-shaped tube 12. The upper ends of the legs 16 and 17 of the U-shaped tube 12 are enlarged to provide bulbs 18 and 19, respectively. The bulb 18, in this embodiment, serves as a reservoir for one thermometric fluid while bulb 19 serves as an expansion chamber. The bulbs 18 and 19 and the adjacent portions of legs 16 and 17 are secured to the backing plate 11 by the upper block 21. The upper block 21, as shown in Figure 1, is formed to provide recesses 22 and 23 for snugly surrounding the bulbs 18 and 19 and adjacent portions of the legs 16 and 17. The upper block 21 is removably secured to the backing plate 11 in any convenient, conventional fashion.

A magnet structure 26 is mounted between the legs 16 and 17 of the U-shaped tube 12. The magnet structure 26 includes a magnet 27 which extends between and into close proximity to the adjacent edges of the legs 16 and 17. A support structure 28 surrounds the magnet 27. The support structure 28 is substantially channel-shaped when viewed from the side thereof (Figure 2) and includes a web 29 and a pair of legs 31 and 32 extending toward the backing plate 11. A flange 33 extends upwardly from the end of leg 32 and is in sliding contact with the surface of backing plate 11. Projections 34, 36, 37 and 38 (Figures 1 and 3) are provided on the corners of the support structure 28 and extend beyond the adjacent edges of the legs 16 and 17 into the space between such legs and the surface of backing plate 11. Thus, the projections 34, 36, 37 and 38 extend further than the spacing between the adjacent edges of legs 16 and 17 and prevent the support structure 28 and the magnet 27 from being removed from between the legs 16 and 17. At the same time, the support structure 28, and particularly the flange 33 thereof, supports and guides the magnet for guided and sliding movement along and between the legs 16 and 17. The channel-shaped support structure 28 provides a convenient handle for manipulating the magnet structure 26.

Two thermometric fluids are disposed within the tube. One of the thermometric fluids, in most instances, mercury, is disposed within the tube and forms columns 40 and 41 within the legs 16 and 17. The other thermometric fluid, which may be an alcohol, completely fills the bulb 18 and the portion of the opening in leg 16 above column 40. An additional fluid, which may partly fill bulb 19, is disposed above the mercury column in leg 17. A pair of indicating elements 42 and 43 are disposed, respectively, in the legs 16 and 17. The indicating elements 42 and 43 are of smaller size than the bore of the tube and are adapted to be moved to positions corresponding to the maximum and minimum temperatures and be left in such positions by the thermometric fluids. Thus, when the mercury within the respective legs 16 and 17 has reached the highest position attained therein and drops downwardly therefrom, the registering element in such leg will remain in such position. The registering elements are formed of, or contain, a suitable magnetically attracted material so that, upon passage of the magnet 27 adjacent thereto, such registering elements will be attracted thereby and will be moved thereby to the desired position.

The surface of backing plate 11 is provided with a temperature scale adjacent each of the legs 16 and 17. As will be apparent from Figure 1, the scale adjacent one of the legs is inverted with respect to the other scale so that the minimum temperature will be registered by one indicating element, here element 42, while the maximum temperature will be registered by the other element. Obviously, the scale may be provided directly on legs 16 and 17, if desired.

Desirably, the backing plate 11 and the blocks 13 and 21 are made of non-magnetic material to provide for more convenient sliding of the magnet structure 26 therealong and to preclude attraction of the indicating elements 42 and 43 except by movement of the magnet.

A wire W is connected to the magnet structure 26 and passes through an opening in the backing plate 11 adjacent the upper end thereof. Thus, the magnet structure may be moved by a user located remote from the thermometer structure, as within a house, by manipulation of the wire.

*Operation*

While the opeartion of the disclosed device is believed to be apparent from the foregoing description it will be briefly reviewed for the purpose of completeness of the description. Further, insofar as the maximum-minimum thermometer by itself is concerned, the operation is entirely conventional and will, accordingly, be only briefly summarized.

Assuming that the registering elements 42 and 43 are in contact with the upper ends of the mercury columns in the legs 16 and 17, if the temperature should rise, the thermometric fluid within bulb 18 will expand and will force the mercury column within leg 16 downwardly and, consequently, the column within leg 17 upwardly. This in the usual manner elevates the indicating element 43 to a level corresponding to the upper end of the mercury column in leg 17. When the temperature drops, the fluid in bulb 18 will contract and will draw the mercury therewith. Thus, the column in leg 17 will drop but the indicating element 43 will in the usual manner remain stationary. Thus, the lower edge of the indicating element 43 will indicate the highest temperature attained during the time period between observations. Simultaneously, as the temperature drops, the mercury column within leg 16 will be drawn upwardly and will elevate the indicating element 42 within such leg 16. Such raising of the indicating element 42 will continue until the temperature has reached its lowest value. When the temperature begins to rise, the mercury column in leg 16 will drop but the indicating element 42 will remain at the position corresponding to the lowest temperature obtained during the time period between observations. Thus, the position of the lower edges of the registering elements 42 and 43 will in a conventional manner indicate the maximum and minimum temperatures achieved during the time period between observations.

When it is desired to reset the thermometer for a subsequent measuring operation, the magnet structure 26 comprising the invention manually is slid along the surface of backing plate 11 upwardly to a position adjacent the uppermost of said indicating elements. The magnet structure 26 is then moved downwardly, preferably, at a fairly slow rate, and the magnet 27 attracts the indicating elements 42 and 43 and causes them to move downwardly within their respective legs into contact with the upper edge of the mercury column in such legs. The thermometer is thus made ready for a subsequent measuring operation.

Where the wire W is used, the magnet structure 26 moves downwardly in response to gravity and is pulled upwardly by the wire W. Thus, the manipulation of the magnet can conveniently be accomplished from a remote location solely by manipulation of the wire W.

*Modification*

Figure 4 illustrates a modified structure for the magnet structure. In this embodiment, the backing plate 11 has an elongated slot 46 extending therethrough parallel with the legs 16 and 17 of the U-shaped tube. The magnet structure 47 includes a magnet 48 which is surrounded by a support and handle structure 49. The support and handle structure 49 may be similar to the support structure 28 except that it will not have the projections 34, 36, 37, and 38. A fastening means 51 extends through the slot 46 and is secured to the support structure 49. The fastening means is slidable along the slot 46 and is provided with the enlarged head 52 to prevent the magnet structure from inadvertently being removed from between the legs 16 and 17. The operation of the device disclosed in Figure 4 will be the same as that of the structure of Figures 1 through 3.

Although particular, preferred embodiments of the invention have been disclosed hereinabove for illustrative purposes, it will be understood that the invention contemplates such variations or modifications as lie within the scope of the appended claims.

I claim:

1. A maximum-minimum, mercury-in-glass type thermometer, comprising: a backing member; a U-shaped glass tube mounted upon said backing member and having liquid mercury therewithin; a pair of magnetically attractable indicating elements disposed within the respective legs of said tube; means within the respective legs of said tube for supporting said indicating elements in the highest position attained by the mercury within the respective legs of the tube; a magnet positioned between and extending into close proximity to the legs of said tube; support means for normally holding said magnet in association with said tube for slidable movement in a direction parallel with said legs, said supporting means including means of greater width than the spacing between adjacent edges of the legs of said tube and disposed therebetween, said last-named means extending between the legs of said tube and the backing member to thereby prevent said supporting means and said magnet from moving transversely away from said backing member.

2. A maximum-minimum, mercury-in-glass type thermometer, comprising: a backing member; a U-shaped glass tube mounted upon said backing member and having liquid mercury therewithin; a pair of magnetically attractable indicating elements disposed within the respective legs of said tube; means within the respective legs of said tube for supporting said indicating elements in the highest position attained by the mercury within the respective legs of the tube; a magnet positioned between and extending into close proximity to the legs of said tube; support means for normally holding said magnet in association with said tube for slidable movement in a direction parallel with said legs; said supporting means including means defining a slot through said backing member, said slot extending parallel with said legs; fastening means extending through said slot and secured to said magnet, said fastening means being slidable along said slot and having an enlarged head thereon of greater width than said slot whereby said magnet is normally held in association with said backing member but is slidable therealong.

References Cited in the file of this patent

UNITED STATES PATENTS

| | | |
|---|---|---|
| 498,651 | Hicks | May 30, 1893 |
| 2,370,968 | Kahl | Mar. 6, 1945 |